UNITED STATES PATENT OFFICE.

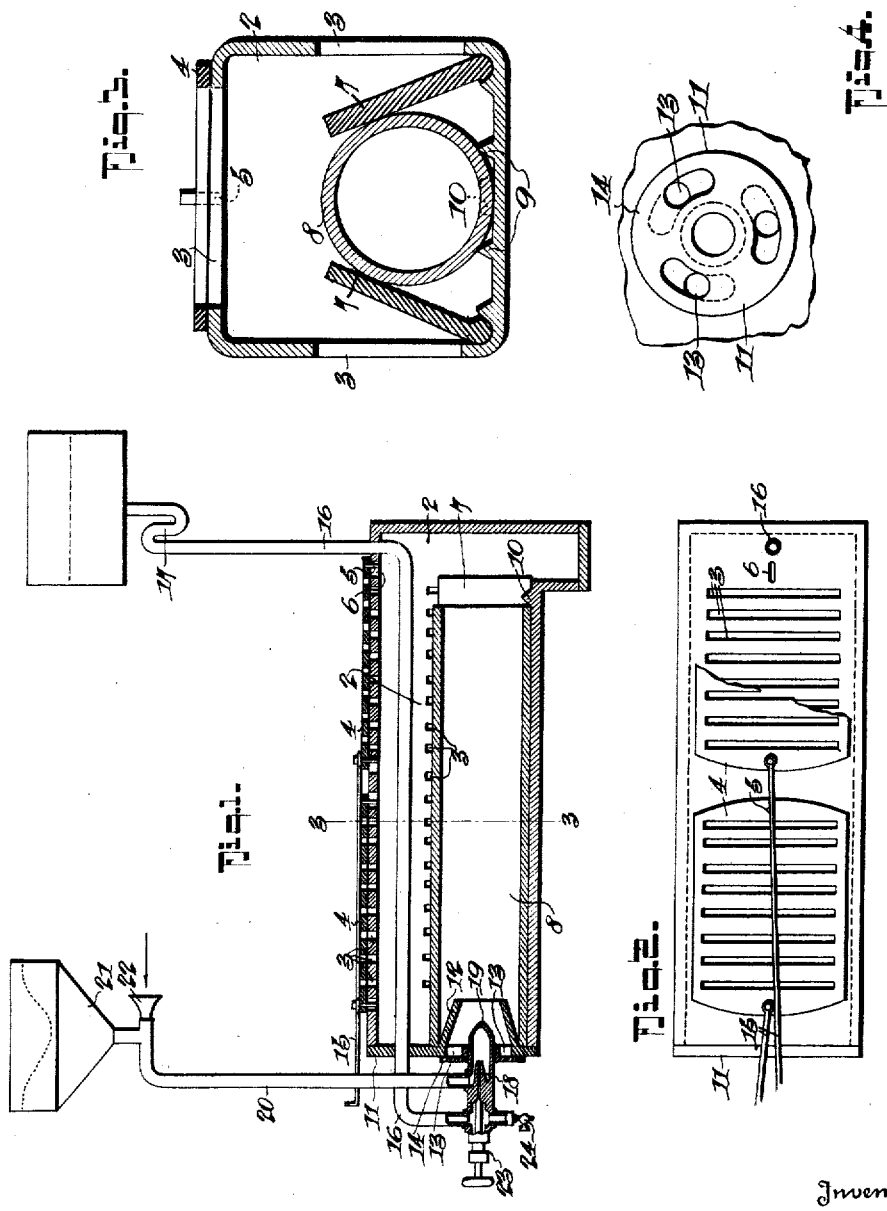

THOMAS CLOUSTON, OF VANCOUVER, BRITISH COLUMBIA, CANADA.

GAS-GENERATOR AND COMBUSTION-CHAMBER FOR PULVERIZED FUEL.

1,344,333. Specification of Letters Patent. Patented June 22, 1920.

Application filed August 8, 1919. Serial No. 316,175.

*To all whom it may concern:*

Be it known that I, THOMAS CLOUSTON, a citizen of the Dominion of Canada, residing at Vancouver, in the Province of British Columbia, Canada, have invented certain new and useful Improvements in Gas-Generators and Combustion-Chambers for Pulverized Fuel, of which the following is a specification.

This invention relates to a gas generator and combustion chamber for use with pulverized coal or other carbonaceous matter, and the improvements are directed to the application of this principle of combustion to a domestic furnace, either for cooking or heating purposes.

Where such fuel is used it is generally introduced into the combustion chamber with compressed air, which necessitates the provision of air compressing appliances, the cost of which is prohibitive when applied to a small plant such as is necessary for domestic use.

In the device, which is the subject of this application, these requirements are dispensed with, by using steam generated by the heat of the furnace for forcibly spraying the fuel into the combustion chamber, and by proportioning the jet of steam to the amount of pulverized carbonaceous matter and to the air admitted, and by combining them under conditions favorable to the requirements of combustion, the water of the steam is dissociated and its gases, oxygen and hydrogen, form a part of the gaseous requirements of complete combustion.

The invention is fully described in the following specification, reference being made to the drawings by which it is accompanied, in which:

Figure 1 is a vertical longitudinal section of the combustion chamber and its fuel and air connections.

Fig. 2 is a plan of the combustion chamber.

Fig. 3 is a cross section through the combustion chamber on the line 3—3 in Fig. 1, and Fig. 4 is an end view of the air control.

In these drawings 2 represents a combustion chamber of refractory material, such as fire-clay, which chamber is preferably rectangular in cross section and is open at the front end into which the fuel is projected, but is closed at the back. The two side walls and the top of this combustion chamber are provided with vertically and transversely disposed slots 3.

These slots in the top wall of the combustion chamber are closed with slidable dampers 4 of similar refractory material provided with corresponding slots, the damper being susceptible of endwise movement by which the apertures 3 may be partially or altogether closed as desired. These dampers 4 are maintained in position and permitted the required endwise movement by pins 5 downwardly projecting from them into lengthwise elongated slots 6 in the top wall of the combustion chamber 2.

The apertures 3 of the side walls are closable by dampers 7 which pivot along the bottom corners of the combustion chamber and close against the inner side of the walls, resting when open against a cylindrical mixing chamber 8. This mixing chamber 8 is open at both ends and extends lengthwise of the combustion chamber from the front end to a short distance from the back where it delivers into the space between it and the end of the combustion chamber. It is retained in position by longitudinal ridges 9 and a projection 10 from the bottom of the combustion chamber.

Although the combustion chamber 2 and its contained mixing chamber 8 are described as separable parts, they may be integral if found convenient to so manufacture them.

The door 11 of the fire box closes at the front the open end of the combustion chamber 2 and of the mixing chamber 8. It is provided with a circular aperture through which the powdered fuel is projected into the mixing chamber, and surrounding the aperture has a hollow frusto-conical projection 12, which fits into the end of the mixing chamber 8. Between this projection 12 and the fuel delivery aperture are air admission apertures 13 closable by a correspondingly apertured rotatable valve-plate 14.

A pipe 16 is carried lengthwise of the fire-box above the combustion chamber 2 and this pipe is connected either with a water service or a reservoir, a trap 17 being introduced in the water pipe connection to prevent the steam generated by the heat of the combustion from passing back. The forward end of this pipe is connected to an injector nozzle 18 which is projected through an outer nozzle 19 to which is connected a pipe 20 through which powdered carbonaceous matter, such as coal or coke, is conducted from a hopper 21, air being admitted at 22 to the pipe 20 to mix with the powdered fuel and separate or scatter the fuel during delivery into the mixing chamber 8.

The steam delivery is provided with an axial control valve 23 and a water trap 24.

In use, heat being initially applied to the combustion chamber by a gasolene torch or otherwise, steam is generated in the pipe 16 and the carbonaceous fuel from the hopper 21, with an amount of air from 22 sufficient to consume a portion of the carbon of the fuel and to heat the remainder of it to incandescence is projected through the delivery nozzle 18 into the forward end of the mixing chamber 8.

In the heat of this mixing chamber 8 and in the presence of the incandescent, unconsumed carbonaceous matter the oxygen of the steam is dissociated from its hydrogen and is taken up by the carbon. The amount of air admitted to the mixing chamber 8 is largely controlled by the rotatable valve plate 14 and can, therefore, be regulated to what is necessary to bring the unconsumed particles of carbon to incandescence when they attract the oxygen from the steam and combine therewith.

The combustion so far described is conducted within the space between the mixing chamber 8 and the walls of the combustion chamber 2, the walls of both chambers being raised to a high temperature thereby.

The control dampers or valves 4 and 7 allow the heated gases to be directed to either side or to either end of the top as required.

As the flame of this escapes from the slits 3 of the combustion chamber into the firebox of the stove or heater, the hydrogen and any unconsumed carbon burns in the free air of the fire box of the stove in which the device is placed.

It will be noticed that although described as a combustion chamber, the chamber 2 with its mixing chamber 8 is also a gas generator and its success is largely due to the particular way in which the powdered fuel is introduced with a jet of steam and the required air whereby the carbonaceous matter is not only consumed in the oxygen of the air but under conditions that permit the steam to be dissociated and its constituent gases consumed.

I am aware that carbonaceous matter has heretofore been introduced by a jet or jets of steam to a furnace or combustion chamber, but in all such with which I am acquainted the pulverized fuel has been mechanically fed to the impassing jet and without the admixture with it of the air necessary to the initial combustion.

The features which contribute to the success of this burner are the delivery of the pulverized carbonaceous matter and air by means of a jet of steam into an elongated open ended but laterally confined mixing chamber of refractory material with a supplementary supply of air under control, and the inclosure of this mixing chamber within a corresponding combustion chamber having a closed end, from which combustion chamber the highly heated products of combustion and the gases generated thereby may be delivered to either side or from the top as required, the combustible elements in the gases being free to burn in the presence of the air of the fire-box into which they are delivered. The delivery within a laterally confined space enables the high heat necessary for dissociation of the gases to be obtained.

Having now particularly described my invention, I hereby declare that what I claim as new and desire to be protected in by Letters Patent, is:

1. A gas generator and combustion chamber, comprising in combination, an elongated combustion chamber of refractory material having closed ends and delivery apertures along the sides and top, an open ended mixing chamber of refractory material lengthwise disposed within the combustion chamber, and means for delivering carbonaceous fuel, steam and air axially within the mixing chamber.

2. A gas generator and combustion chamber, comprising in combination an elongated combustion chamber of refractory material having closed ends and transversely elongated delivery apertures along the sides and top with means for controlling delivery through the apertures, an open ended mixing chamber of refractory material and circular in cross section lengthwise disposed within the combustion chamber, a nozzle axially projected into one end of the mixing chamber through which nozzle powdered carbonaceous fuel and air is delivered with a jet of steam, and means for admitting a supplementary supply of air to the mixing chamber adjacent the fuel delivery.

3. A gas generator and combustion chamber, comprising in combination an elongated combustion chamber of refractory material, said chamber being substantially rectangular in cross section and having closed ends and transversely elongated delivery apertures in each side and across the top, independent means controlling delivery through the apertures of each side and top, an open ended mixing cylinder of refractory material lengthwise disposed along the bottom within the combustion chamber from the front end to adjacent the after end, a nozzle axially projected into the forward end of the mixing chamber through which nozzle powdered carbonaceous fuel and air is delivered with a jet of steam, means for admitting a supplementary supply of air to the mixing chamber around the fuel delivery nozzle, and means controlling the amount of air so admitted.

4. A gas generator and combustion chamber, comprising in combination, an elongated combustion chamber having closed ends and elongated apertures disposed transversely in the sides and top, an open ended mixing chamber disposed lengthwise of the combustion chamber to adjacent the after end, a pipe extending lengthwise within the combustion chamber over the mixing chamber to the after end of which pipe water is delivered and the forward end of which is connected to a steam delivery nozzle projecting axially within the forward end of the mixing chamber, a nozzle concentric with and projecting beyond the end of the steam delivery nozzle, means for delivering carbonaceous fuel and air to the outer nozzle, means for admitting a supplementary amount of air to the mixing chamber around the fuel delivery nozzle, and means for controlling the amount of air so admitted.

In testimony whereof I affix my signature.

THOMAS CLOUSTON.